Dec. 26, 1922.
A. J. NELSON.
TEMPERATURE AND PRESSURE CONTROLLER.
FILED AUG. 28, 1919.
1,439,750
3 SHEETS-SHEET 3
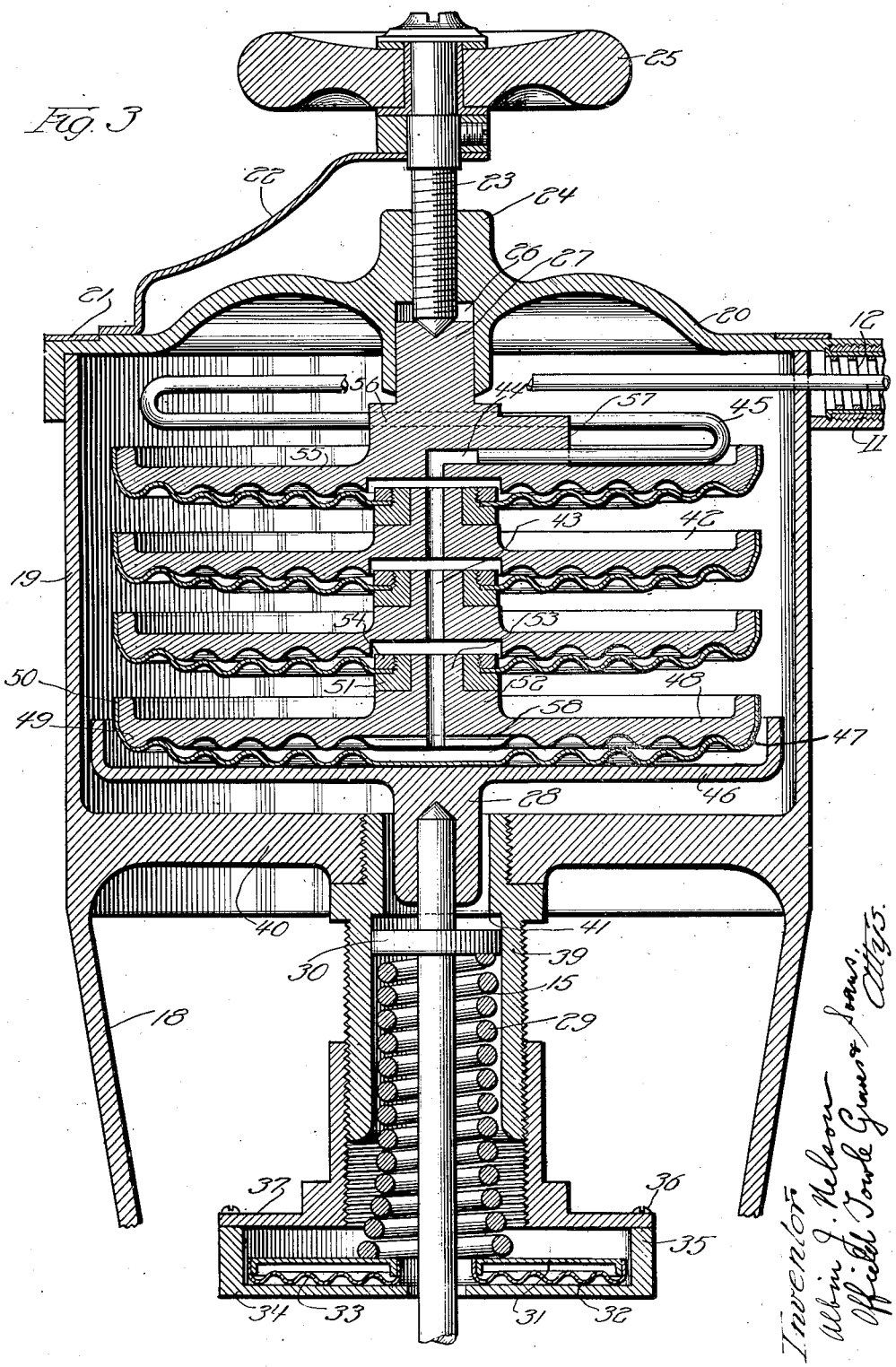

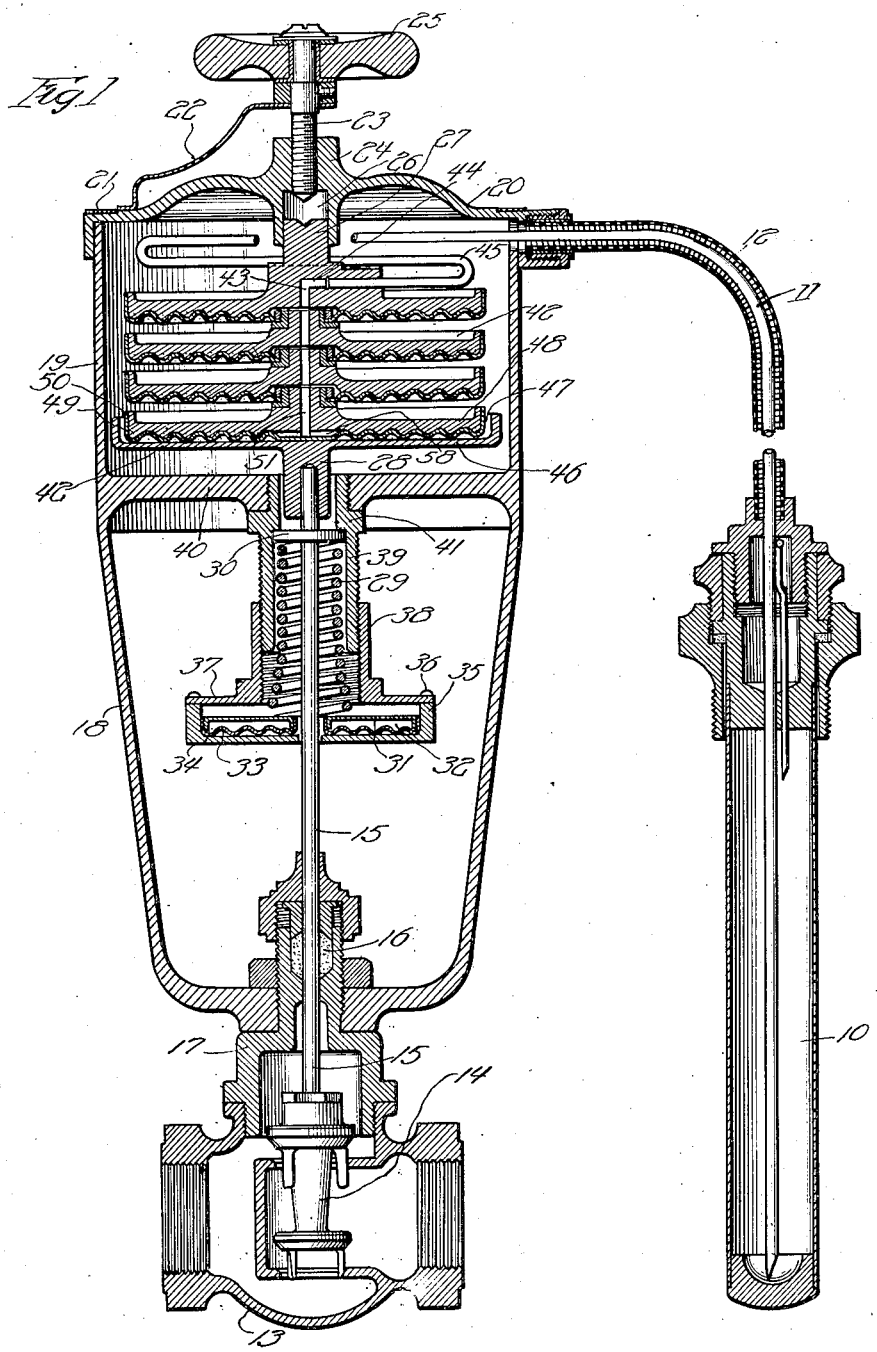

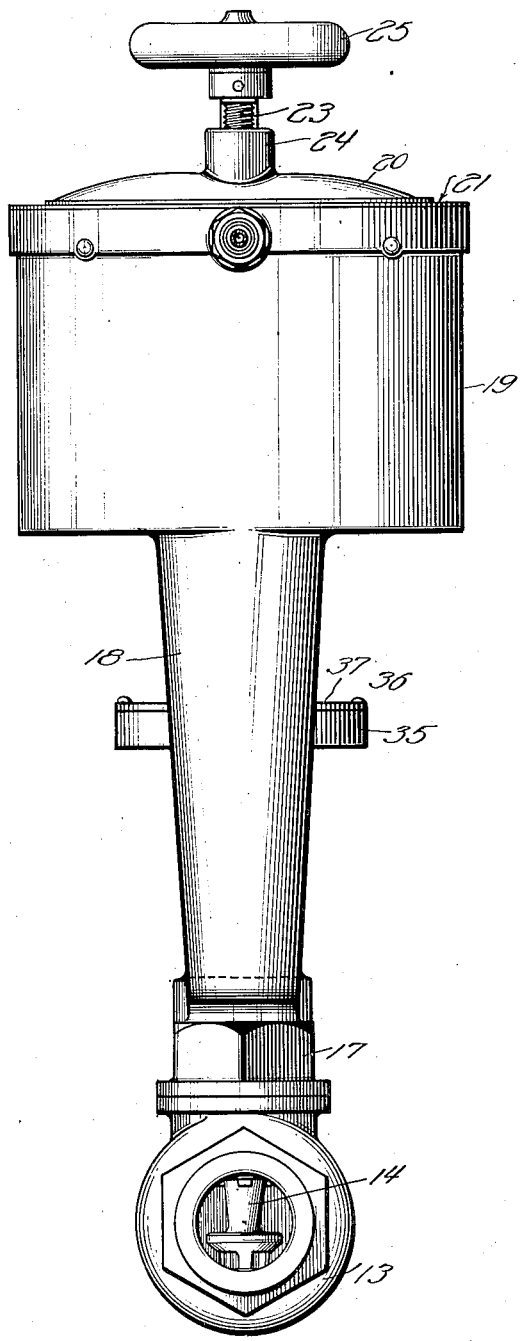

Patented Dec. 26, 1922.

1,439,750

UNITED STATES PATENT OFFICE.

ALBIN J. NELSON, OF EAU CLAIRE, WISCONSIN.

TEMPERATURE AND PRESSURE CONTROLLER.

Application filed August 28, 1919. Serial No. 320,388.

*To all whom it may concern:*

Be it known that I, ALBIN J. NELSON, a subject of the King of Sweden, having declared my intention to become a citizen of the United States, and a resident of Eau Claire, in the county of Eau Claire and State of Wisconsin, have invented certain new and useful Improvements in Temperature and Pressure Controllers, of which the following is a specification.

My invention relates to improvements in controlling apparatus and although capable of divergent application, is particularly well adapted for the automatic control of the temperature or pressure of bodies of liquid or other fluid.

The principal objects of the invention are to provide temperature or pressure controlling apparatus which will be inactive to reduce the maximum effect of the heat or pressure-supplying agent until substantially the temperature or pressure for which the controller is set has been attained; to provide an apparatus which will be, within the desired limits, extremely sensitive to slight changes of temperature, or pressure, to provide an expansible element or diaphragm motor having a minimum fluid capacity and a maximum area to be acted on by said fluid; to provide a construction which shall be self-compensating with respect to the effect of heat conveyed to the apparatus by conduction or otherwise from the heating agent; to provide a construction having means for quickly and conveniently changing the adjustment; to provide an improved mechanical construction so organized that it may be assembled with a minimum of effort or troublesome manipulation; to provide an improved durable and efficient construction which will maintain its adjustment indefinitely, which may be manufactured at a minimum cost while being simple in design and inexpensive to maintain and operate and in general to provide an improved controller construction of the character referred to.

In the drawings accompanying this specification I have illustrated my invention as applied to an apparatus for regulating or controlling the temperature of a tank heated by hot water or steam. In the said drawings—

Fig. 1 is a vertical section through the complete apparatus, certain parts being broken away, Fig. 2 is an end elevation of Fig. 1, minus the capillary tube and bulb shown in Fig. 1, and Fig. 3 is an enlargement of a portion of Fig. 1, but showing the expansible elements or motor actuated to control or regulate the tank temperature.

In the drawings, 10 designates as a whole a controller bulb inserted in the desired location in the tank, the temperature of which is to be controlled, said bulb containing the usual supply of ether or other appropriate fluid, the vapors from which are conveyed to the motor by means of a capillary tube 11. 12 represents flexible armor by which the capillary tube 11 is protected from damage or abuse.

The valve body 13 is interposed in the line used for supplying the heating fluid to the tank which is being heated. Said valve body is fitted with the appropriate balanced or other valve 14 which is controlled by a vertical valve stem 15 extending upwardly through a suitable stuffing box 16. The bonnet 17 of the valve body serves as a support for a frame which includes a bifurcated bracket having arms 18 which support the motor housing 19 of the controller. Said arms 18 may be formed or cast integral with the motor housing 19, which thus constitutes an extension of said frame.

The upper end of the motor housing 19 is closed by a demountable cap 20, the circumference of which is engraved or otherwise marked with a suitable scale 21, the flexible pointer 22 serving as an index by which the device may be set to the desired temperature. The actual adjustment of the controller is effected instantaneously by means of a set screw 23 fitting a suitably tapped central hole drilled in the boss 24 of the cap, it being understood that the upper end of the said screw 23 is equipped with the usual insulated hand wheel 25.

The lower end of the set screw 23 is pointed or coned and projects downwardly into a cylindrical vertical bore 26 formed in the lower or inner end of the boss 24, said cylindrical bore 26 serving as a guide for the upper stud 27 of the motor. The lower stud 28 of the motor is supported on the upper end of the valve stem 15, the expansion or movement of the motor due to rise in temperature serving to effect at the proper time downward movement of the valve stem 15 to arrest or retard the flow of the heating fluid.

It will be observed that in the inactive position of the parts, as shown in Fig. 1 of the drawing, the stud 27 is spaced from and does not contact with the point of the set screw 23. Also it will be seen that the valve 14 is open to its fullest extent. The valve is maintained in said fully open position by means of a compression spring 29 which engages a collar 30 fixed on the upper end of the valve stem 15 just below the lower end of the stud 28. It will be understood that the spring 29 is of amply sufficient capacity to raise the valve stem 15 against any frictional effect due to the valve stem gland or stuffing box 16.

The lower end of the compression spring 29 is supported on the upper face of a flanged flat annular plate 31 which constitutes the upper wall of a thermostatic chamber 32, the lower wall of which is formed by a flexible flanged and corrugated diaphragm 33 into which the plate 31 is nested and secured by soldering or in any desired manner. The lower flexible wall 33 of the thermostatic chamber 32 is supported on a plate 34 which by means of a flange 35 and screws 36 is secured to the horizontal flange 37 of a nipple 38. Said nipple 38 is internally threaded to screw over the lower end of a threaded tubular member 39, the upper end of which screws into a suitably threaded vertical aperture located centrally in plate 40 forming the lower wall of the motor housing 19.

It will be observed that the spring 29 is effective to force the valve stem 15 upwardly to the point where the collar 30 will engage a fixed stop comprising an internal shoulder 41 in the upper portion of the threaded tube 39, said tube being bored out internally of sufficient diameter to readily accommodate said coiled spring 29, and constituting a part of the frame. It will be manifest that the pressure of the spring 29 upon the top wall 31 of the thermostatic chamber 32 may be adjusted by rotating the flanged nipple 38 with reference to the stationary threaded supporting tube 39, such adjustment being for the purpose of regulating the compensating effect of the compensating thermostat 32, the function of which is to make the apparatus self-compensating to counteract the expansion or opening of the motor when filled with volatile fluid or vapor from the bulb 10 due to heat from the heating element being conducted into or radiated onto the diaphragm chambers comprising the motor. It will be understood that the cell or chamber 32 contains volatile fluid having the necessary physical characteristics to secure the desired compensating effect under the conditions found in operation.

The diaphragm motor designated as a whole 42, consists of a series of cells or chambers, in the present instance four, communicating with each other through a central conduit 43, the upper end of which is connected by means of a small transverse bore 44 with the coiled end 45 of the capillary tube 11. Said coiled portion 45 of the tube 11 constitutes a flexible connection permitting free expansion of the motor. The cells or chambers are supported upon a rigid flanged bottom plate 46 on the lower surface of which there is formed the stud 28 previously referred to. Each of the cells or chambers of the diaphragm motor 42 is constructed with the usual corrugated annular flexible metallic diaphragm 47 which co-operates with a superposed similarly corrugated upper plate 48, the diaphragm forming the lower wall of the diaphragm cell, and the top plate 48 constituting the upper wall. The diaphragm of the bottom cell 49 of the series is imperforate and extends unbroken across the center of the supporting plate 46. Each of the diaphragms is flanged as shown at 50, the edge of the flanges being secured to the similarly flanged plate 48 by means of solder or other means capable of making a hermetic seal.

The construction of the main series of cells is such that, normally, the diaphragms 47 are in substantial contact with their co-operating top plates 48, the crevice between said parts constituting the cell. Hence the cubical content of the cell will be a minimum, while the full area of the cell is available for causing expansion, thereby insuring extremely sensitive and withal reliable operation.

In assembling the cells the plates 48 is first nested in the diaphragm 47 and the flange is soldered. A small thimble 51 which fits a reduced upper extension or stud 52 projecting from the upper surface of a central boss 53 on the plate 48 is then slipped into position over said stud. The diaphragm of the next cell which has been perforated to fit loosely over the threads of the upper end of the thimble 51, is then placed in position and securely clamped by means of an annular lock nut 54 threaded onto the upper end of the thimble 51 and engaging the upper surface of the central portion of the diaphragm. The parts 52, 51 and 54 are then sweated together with solder so as to form a hermetic seal preventing the escape of volatile fluid through the joint between the two cells. The upper plate or wall of the second or upper cell of the series is then nested within the flange of the upper diaphragm and sealed in position after which the remaining units are assembled in a similar manner. The top plate 55 of the series is formed with a substantial boss 56 on its upper face, the stud 27 constituting an upper extension of the said boss 56. The end 45 of the capillary tube is soldered onto a lateral extension 57 of the said central boss 56 and connects with the lateral conduit 44 heretofore referred to.

If desired, in order to permit free passage of volatile fluid into the cells from the central conduit 43, the under sides of the disk plates 48 may be grooved out slightly as indicated at 58 in Fig. 3, although ordinarily there will be no occasion for such a groove.

When the heating fluid commences to enter the tank which is to be heated the parts are initially in the position shown in Fig. 1 with the valve stem 15 fully elevated and the valve 14 open to its maximum extent. This condition continues until substantially the desired temperature is reached for the reason that the vaporizing of the volatile fluid due to the increase of temperature in the tank simply causes the cells of the diaphragm motor to expand upwardly, downward movement being prevented by reason of the supporting spring 29.

Except for the weight of the parts there is no tendency for the lower end of the diaphragm motor to be depressed by the expansion of the cells until the stud 27 strikes the lower end of the set screw 23. Thereafter for a short period there is no further expansion of the diaphragm motor until the temperature has increased sufficiently to cause the expansive force to overcome the upward pressure of the spring 29. Until this time the collar 30 is engaged with the shoulder 41 and the valve remains open to its fullest extent. This is an extremely important feature in connection with my invention as it reduces considerably the time necessary to heat the tank or the body of fluid to the desired temperature for which the controller is set, regulation, i. e. diminution of the flow of heat not occurring until the valve stem 15 commences to move downwardly.

It will be understood that the various parts or elements such as the flexibility of the diaphragms, the strength of the spring 29, and the character of volatile fluid used in the bulb 10 will be suitably co-ordinated and arranged to fit the range of temperature for which the particular controller in question is designed to operate. The same remarks will apply to the design of the compensating cell 32, the dimensions and other physical characteristics of which must be properly adjusted for the particular controller for which compensation is desired.

The boss 60, through which passes the tube 11, is made as a part of the cap 20 so that said tube as well as the motor may be removed for repair or adjustment, or handled for any other purpose, by merely taking off the cap. Thus, the valve-actuating mechanism is not affected.

The described details of construction are merely illustrative of a specific application of my invention, the scope of which should be determined by reference to the appended claims, the language of said claims to be construed as broadly as possible consistent with the state of the art.

I claim—

1. In controlling apparatus, the combination of a flow-regulating valve, a frame provided with a stop, a rod slidable in said frame for actuating said valve, a spring for holding said rod in engagement with said stop, thereby to hold open said valve, an extension on the end of said frame remote from said valve, said extension being provided with a demountable part, forming with said extension an enclosure, and a diaphragm motor mounted in said enclosure and interposed between said demountable member and said rod for actuating the latter.

2. In controlling apparatus, the combination of a flow-regulating valve, a frame provided with a stop, a rod slidable in said frame for actuating said valve, a spring for holding said rod in engagement with said stop, thereby to hold open said valve, an extension on the end of said frame remote from said valve, said extension being provided with a demountable part, forming with said extension an enclosure, a diaphragm motor mounted in said enclosure and interposed between said demountable member and said rod for actuating the latter, and an adjustable member exteriorly operable carried by said demountable member for varying the amount of lost motion provided for said motor.

3. In controlling apparatus, the combination of flow-regulating means, a rod for actuating the same, a frame, means for normally holding said rod in engagement with a part of said frame, an expansible cell interposed between a part of said frame and said actuating rod for operating said rod, and when in released condition being out of contact with one of said parts and adapted to expand idly when initially actuated.

4. In controlling apparatus, the combination of flow-regulating means, a rod for actuating the same, a frame, means for normally holding said rod in engagement with a part of said frame, an expansible cell interposed between a part of said frame and said actuating rod for operating said rod and when in released condition being out of contact with one of said last mentioned elements and adapted to expand idly when initially actuated, and an adjustable stop on one of said elements for varying the amount of lost motion.

5. In apparatus of the class described the combination of a flow-regulating valve, a frame, a valve-actuating rod slidably mounted in said frame, a spring normally holding said valve in fully open position, an expansible element interposed between a portion of the frame and the end of said rod and being provided with lost motion, whereby said element may expand without actuating said rod, and an adjusting screw for regulating the amount of said lost motion.

6. In combination, a flow-regulating valve, a slidable rod for actuating said valve, a frame within which said rod is slidable, an upper extension of said frame constituting a casing, a diaphragm motor in said casing, said frame operating as a stop for the valve rod when the valve is fully open, a spring for forcing said rod towards said stop, an adjusting screw in said casing substantially alined with said rod and exteriorly operated, and a diaphragm motor in said casing for actuating said rod, interposed between said screw and said rod but normally not engaging one of said last named elements and capable of a substantial amount of free expansion before filling the space between said two elements.

7. In combination, a flow-regulating valve, a member for actuating the same, a frame provided with a stop, an element carried by said frame and arranged to actuate said member, a spring normally acting upon said member to hold the same against said stop against the action of said element, a support for said spring threadedly secured to said frame for adjusting the tension of said spring, and a compensating thermostatic element interposed between said spring and said support.

8. In combination, a flow-regulating valve, a slidable rod for actuating said valve, a frame within which said rod is slidable, an upper extension of said frame constituting a closed casing, a diaphragm motor in said casing and engaging the upper end of said rod, said frame acting as a stop for the valve rod when the valve is fully open, and adjusting means in the upper end of said casing normally not engaging the motor when the latter is released but arranged to act as a stop for the upper end of the same while the motor is operative, a spring surrounding said rod and engaging the latter to force the same against said frame, and an adjustable support for the lower end of said spring provided with a thermostatic element for adjusting the tension of said spring to compensate for heat conducted through said frame to the main expansion element.

ALBIN J. NELSON.